(12) United States Patent
Barrau

(10) Patent No.: US 12,540,821 B2
(45) Date of Patent: Feb. 3, 2026

(54) METHOD FOR ASSISTING WITH THE NAVIGATION OF A VEHICLE

(71) Applicant: SAFRAN, Paris (FR)

(72) Inventor: Axel Barrau, Moissy-Cramayel (FR)

(73) Assignee: SAFRAN, Paris (FR)

( * ) Notice: Subject to any disclaimer, the term of this patent is extended or adjusted under 35 U.S.C. 154(b) by 163 days.

(21) Appl. No.: 18/281,395

(22) PCT Filed: Mar. 11, 2022

(86) PCT No.: PCT/FR2022/050443
§ 371 (c)(1),
(2) Date: Sep. 11, 2023

(87) PCT Pub. No.: WO2022/189761
PCT Pub. Date: Sep. 15, 2022

(65) Prior Publication Data
US 2024/0159538 A1  May 16, 2024

(30) Foreign Application Priority Data

Mar. 11, 2021  (FR) ..................................... 2102423

(51) Int. Cl.
*G01C 21/16*  (2006.01)
(52) U.S. Cl.
CPC .................. *G01C 21/165* (2013.01)
(58) Field of Classification Search
CPC ................................................... G01C 21/165
See application file for complete search history.

(56) References Cited

U.S. PATENT DOCUMENTS

| | | | | |
|---|---|---|---|---|
| 3,232,103 | A | * | 2/1966 | Schneider .......... G01C 21/1652 701/503 |
| 5,485,384 | A | * | 1/1996 | Falconnet ............... G01S 13/86 701/445 |
| 2006/0089786 | A1 | * | 4/2006 | Soehren ................. G01C 21/20 340/995.12 |

(Continued)

FOREIGN PATENT DOCUMENTS

WO   WO-2015098211 A1 * 7/2015 ........... G01C 21/165

OTHER PUBLICATIONS

Kelly "Uncertainty 3:—State Space Kalman Filters", CMU School of Computer Science, Fall 1996 (Year: 1996).*

(Continued)

*Primary Examiner* — Fadey S. Jabr
*Assistant Examiner* — Michael J Herrera
(74) *Attorney, Agent, or Firm* — Birch, Stewart, Kolasch & Birch, LLP

(57) ABSTRACT

Method, navigation device and computer program product for assisting with the navigation of a vehicle equipped with a navigation device, comprising the following steps: acquiring (201) a priori values of kinematic variables of the navigation device, determining (202) respective current values of kinematic variables of the navigation device and a current uncertainty matrix representative of an uncertainty of the respective current values of the kinematic variables, based on respective previous values of the kinematic variables, determining (203) a correction, updating (204) the respective current values of the kinematic variables based on the correction and on the current uncertainty matrix.

12 Claims, 4 Drawing Sheets

(56) References Cited

U.S. PATENT DOCUMENTS

| | | | | |
|---|---|---|---|---|
| 2012/0013505 A1* | 1/2012 | Vourc'h | ............... | G01S 19/20 |
| | | | | 342/357.58 |
| 2018/0172842 A1* | 6/2018 | Ding | ............... | G08G 1/005 |
| 2018/0216942 A1* | 8/2018 | Wang | ............... | G01S 17/89 |
| 2018/0340779 A1* | 11/2018 | Faulkner | ............... | G01C 21/188 |
| 2020/0088521 A1* | 3/2020 | Glevarec | ............... | G01C 21/188 |
| 2022/0178699 A1* | 6/2022 | Coatantiec | ............... | G01C 25/00 |

OTHER PUBLICATIONS

Machine Translation of WO 2015098211 A1 obtained from Clarivate Analytics on May 3, 2025 (Year: 2015).*

* cited by examiner

METHOD FOR ASSISTING WITH THE NAVIGATION OF A VEHICLE

FIELD OF THE INVENTION

The present invention relates to the field of navigation methods for a vehicle. More particularly, it relates to so-called hybrid navigation methods.

PRIOR ART

Hybrid navigation methods are methods in which measurements originating from a plurality of sensors (accelerometers, gyroscopes, GPS, etc.) are combined in order to determine variables or kinematic information defining the state of a device implementing the method.

These kinematic variables are, for example, a position, velocity or orientation of the device.

The measurements are, for example, inertial measurements, for example obtained from accelerometers and gyroscopes, such as the specific force, the angular velocity or velocity of rotation of the device, velocity measurements or position measurements of the device. The specific force is the sum of the external forces other than gravity, divided by the mass. This quantity therefore has the dimensions of an acceleration.

Linear Kalman filters are known, an example of which is shown in FIG. 1. On the middle line, it can be seen that the estimated state undergoes a series of propagations (using the inertial measurements) and updates (using an additional sensor, such as a GPS receiver or an odometer, a camera, etc.). The updates are corrections to the state value estimated taking into account the new measurement from the additional sensor. The sensor does not give the correction to be applied, but only gives a measurement dependent on variables to be estimated. The difference between this measurement and the estimated value of the kinematic parameter is referred to as "innovation". In order to transform this innovation into a correction of the state of the device, a so-called "gain" matrix K is required. It is calculated from the Riccati equation appearing on the bottom line. This equation maintains an uncertainty (or "covariance matrix") enabling the gain matrix to be constructed. If the estimation of the state is false, the measurements combined with the gain matrices make it possible to correct it over time.

However, these linear Kalman filters cannot operate in the case where the model describing the state to be estimated is not linear. In this case, it is necessary to use a non-linear (or "extended") Kalman filter, shown in FIG. 2.

In FIG. 2, the arrow running from the middle line to the bottom line shows the estimated state of the device. This estimated state is used to calculate the uncertainty and the gains. Consequently, a feedback appears and an error in the estimated state induces an error in the gains which, in turn, induces an error in the estimated state. The stability of an extended Kalman filter depends entirely on the intensity of this feedback.

This feedback is not intrinsic to the system considered and depends on the coordinate system used, which has great importance for extended Kalman filtering. More precisely, the feedback depends on the coordinates used for the representation of errors, referred to as "error variables". A common system of error variables for extended Kalman filtering is simply (with T, V, X the orientation, velocity and position variables):

$e_T = \hat{T}^{-T} T$ $e_V = V - \hat{V}$ $e_X = X - \hat{X}$

A system of error variables used to construct an invariant inertia-GPS combination filter and enabling the feedback to be almost entirely suppressed, is:

$e_T = \hat{T}^{-T} T$ $e_V = \hat{T}^{-T}(V - \hat{V})$ $e_X = \hat{T}^{-T}(X - \hat{X})$ A system of error variables used to construct an invariant inertia-odometer combination filter and enabling the feedback to be almost entirely suppressed, is:

$e_T = T \hat{T}^{-T}$ $e_V = V - T \hat{T}^{-T} \hat{V}$ $e_X = X - T \hat{T}^{-T} \hat{X}$ However, none of the two preceding systems of error variables enables the feedback to be strongly suppressed both for the inertia-GPS combination and the inertia-odometer combination. In particular, nothing enables, in a given filter, combining of inertial measurements, position measurements and odometer-based velocity measurements. The invention makes this combination possible using the last error variable defined above.

It is also known to use two filters, independently using the measurements from position sensors and odometry sensors. However, this does not make it possible to combine these measurements and therefore the result is sub-optimal and corresponds approximately to the performance of the better of two filters.

There is therefore a need for a novel type of navigation method which will enable combining of position measurements and inertia measurements.

DISCLOSURE OF THE INVENTION

The invention proposes to overcome the above-mentioned disadvantages.

For this purpose, the invention proposes, according to a first aspect, a method for assisting with the navigation of a vehicle equipped with a navigation device comprising the following steps: acquiring a priori values of kinematic variables of the navigation device; determining respective current values of kinematic variables of the navigation device and a current uncertainty matrix representative of an uncertainty of the respective current values of the kinematic variables, on the basis of respective preceding values of the kinematic variables; determining a correction from the respective current values of the kinematic variables, of a current uncertainty matrix representative of an uncertainty of the respective current values of the kinematic variables, of a measurement of one of the kinematic variables, and of a gain matrix dependent on the measurement; updating (204) the respective current values of the kinematic variables on the basis of the correction and of the current uncertainty matrix.

Hence, this method makes it possible to determine the value of the kinematic variables of the navigation device. It offers more precise navigation by combining all the available measurements in the same filter.

In an embodiment the kinematic variables comprise an orientation of the navigation device (DISP), a current value of which is a current orientation matrix and a preceding value of which is a preceding orientation matrix, a velocity of the navigation device (DISP), a current value of which is a current velocity vector and a preceding value of which is a preceding velocity vector and a position of the navigation device (DISP), a current value of which is a current position vector and a preceding value of which is a preceding position vector. The current uncertainty matrix is representative of an uncertainty of the current orientation matrix, the current velocity vector and the current position vector. The preceding uncertainty matrix is representative of an uncertainty of the preceding orientation matrix, the preceding velocity vector and the preceding position vector.

In an embodiment, a virtual observation function is determined on the basis of the measurement, an observation matrix obtained by applying a limited first order expansion to the virtual observation function and the gain matrix obtained on the basis of the observation matrix.

In an embodiment, the current values are associated with a current time and the preceding values are associated with a preceding time. The determining of the current values of the kinematic variables comprises: determining the current velocity vector by addition, to the preceding velocity vector, of an integration over a time interval between the preceding time and the current time, of a sum of a specific force of the navigation device and of a model of Earth gravity experienced by the navigation device; determining the current position vector by addition, to be preceding position vector, of an integration, over the time interval, of the preceding velocity vector; determining the current orientation matrix by multiplication of the preceding orientation matrix with a matrix representative of a rotation of the navigation device; and/or determining the current uncertainty matrix on the basis of the preceding uncertainty matrix.

In an embodiment, the measurement is a measurement of the position of the navigation device, the determining of the correction comprises a subtraction of the current position vector and of the measurement of the position, and a multiplication of the subtraction by the gain matrix. In an embodiment, the correction is a correction vector, the updating comprises a substep of updating the current orientation matrix by multiplication of a rotation matrix of a first part of the correction vector and of the current orientation matrix, a substep of updating the current velocity vector by addition, to a second part of the correction vector, of a multiplication of the rotation matrix of the first part of the correction vector and of the current velocity vector, and/or a substep of updating the current position vector by addition, to a third part of the correction vector, of a multiplication of the rotation matrix of the first part of the correction vector and of the current position vector.

In an embodiment, the respective current values of the kinematic variables are first respective current values of the kinematic variables, the respective preceding values of the kinematic variables are first respective preceding values of the kinematic variables, the correction is a first correction, the measurement of one of the kinematic variables is a first measurement of one of the kinematic variables, the gain matrix is a first gain matrix. The method further comprises determining second respective current values of the kinematic variables of a navigation device, on the basis of second respective preceding values of the kinematic variables; and, determining a second correction from second respective current values of the kinematic variables, of a second measurement of one of the kinematic variables and of a second gain matrix. The method also comprises updating of the second respective current values of the kinematic variables on the basis of the second correction.

In an embodiment, the method further comprises determining respective consolidated values of the kinematic variables from the first respective current values of the kinematic variables and second respective current values of the kinematic variables.

In an embodiment, the determining of respective consolidated values of the kinematic variables comprises determining a similarity between the first current values and the second current values and, when the similarity exceeds a threshold, the determination comprises averaging of the first current values and second current values or weighted averaging of the first current values and second current values or selecting the first current values or second current values.

Another aspect of the invention relates to a navigation device comprising a processing unit, three accelerometers, three gyroscopes and a measurement device of a position of the navigation device. The processing unit is configured to implement the method for assisting with the navigation.

Another aspect of the invention relates to a computer program product comprising program code instructions for executing the steps of the method for assisting with the navigation.

DESCRIPTION OF THE FIGURES

Other features and advantages of the invention will emerge from the following description, which is given purely by way of illustration and not being limiting and which should be read with reference to the attached figures, in which.

DETAILED DESCRIPTION OF THE INVENTION

Figure 1:
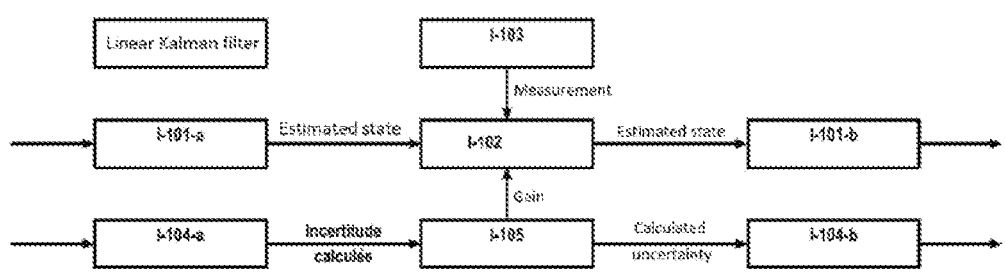
FIG. 1 shows a linear Kalman filter.
Figure 2:
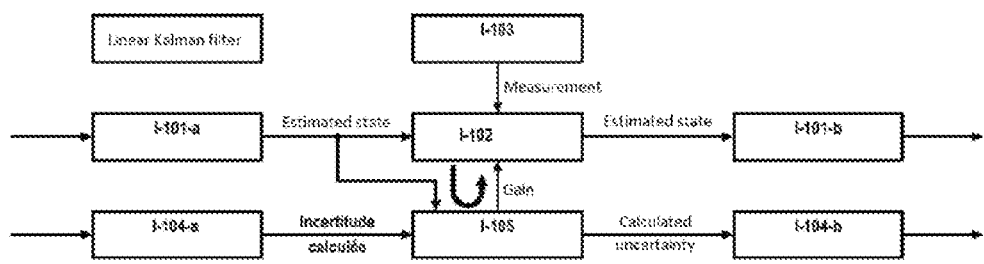
FIG. 2 shows an extended Kalman filter.
Figure 3:
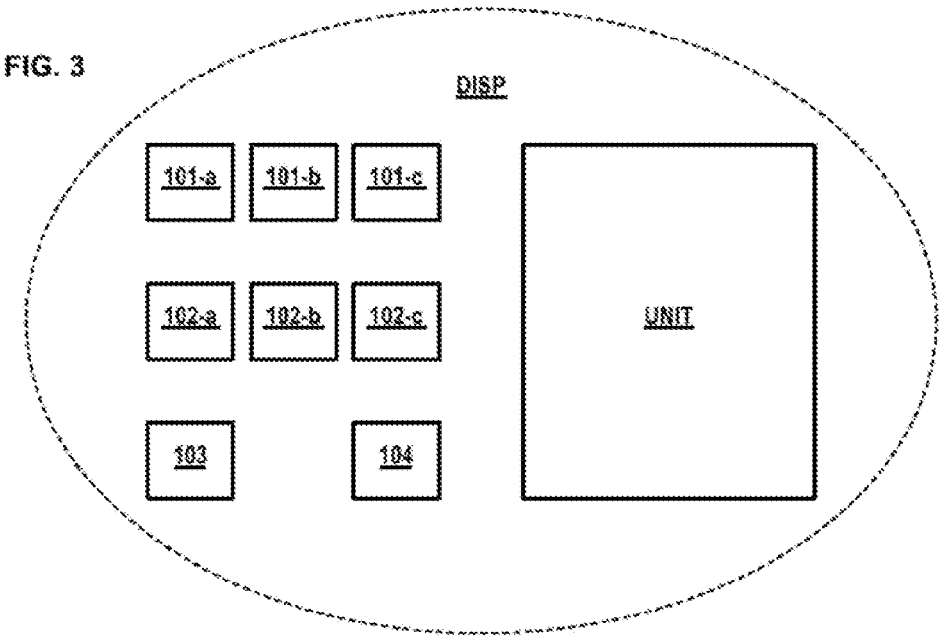
FIG. 3 shows a navigation device of the invention.

FIG. 3 schematically shows a navigation device DISP. This navigation device DISP comprises a processing unit UNIT. This processing unit UNIT comprises a processor or a microcontroller for general or specific use and a memory.

The processor or microcontroller can be an application-specific integrated circuit (ASIC), it can also be a programmable logic circuit or field-programmable gate array (FPGA).

The memory can be fixed or removable and include different memory units that can include a combination of units enabling volatile and non-volatile storage. The memory is configured to store a software code that can be used by the processor or the microcontroller in order to carry out a method for determining respective values of kinematic variables of the navigation device DISP.

The values of the kinematic variables enable the location of the navigation device DISP and thus the navigation of the bearer of this device.

The navigation device DISP also comprises
three accelerometers 101-a to 101-c,
three gyroscopes 102-a to 102-c and
a measurement device 103 of a position of the navigation device DISP.

The navigation device DISP can also include other devices for measuring a kinematic variable, a combination of several kinematic variables, or additional variables also estimated by the Kalman filter of the navigation device DISP.

Moreover, the navigation device DISP can also include a measurement device 104 of a distance travelled by the bearer of the navigation device DISP. This measurement device 104 is, for example, an odometer 104.

The three accelerometers 101-a to 101-c are able to deliver specific force data. The three accelerometers are associated respectively with three axes which can be mutually orthogonal.

The three gyroscopes 102-a to 102-c are able to deliver angular velocity data. The three gyroscopes are associated respectively with three axes which can be mutually orthogonal.

More precisely, the accelerometers measure a specific force $f_n$ of the navigation device DISP and the gyroscopes measure an angular velocity of the navigation device DISP. This angular velocity is then transformed into a rotation matrix $\Omega_n$ representative of the rotation of the device. The time interval between two measurements is denoted dt.

Accelerometers and gyroscopes can either provide specific forces and angular velocities, or directly supply variations in velocity and angle.

The measurement device 103 of a position of the navigation device DISP is for example:
a navigational satellite receiver, for example a global positioning system receiver (GPS) or a Galileo type receiver,
a device performing a triangulation by using navigation marks for which the position is known, or
a laser detection and ranging device (LIDAR) of a set of known navigation marks enabling the position of the vehicle to be calculated.

In the case where the measurement device 103 of a position is not co-located with the navigation device DISP, the distance between the measurement device 103 and the navigation device DISP is considered as a constant bias on the virtual measurement of the position of the beacon in the reference frame of the bearer. This virtual measurement is defined below. This bias is, for example, known or estimated at the time of implementing the method of the invention.

The data delivered by the three accelerometers 101-a to 101-c, by the three gyroscopes 102-a to 102-c, by the measurement device 103 of a position and optionally by the odometer 104 are received by the processing unit UNIT.

Figure 4:
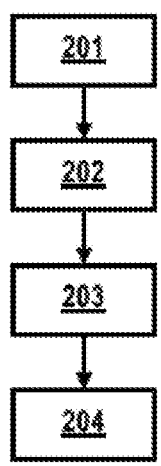
FIG. 4 shows an embodiment of the navigation method of the invention.

The processing unit UNIT is configured by implementing the navigation method by means of determining respective values of kinematic variables of the navigation device DISP. This method is shown in FIG. 4. It thus enables the location of the navigation device DISP and thus the navigation of the bearer of this device.

The method of the FIG. 4 comprises the following steps:
acquiring 201 kinematic variables a priori of the navigation device,
determining 202 respective current values of kinematic variables of a navigation device DISP and of a current uncertainty matrix representative of an uncertainty of the respective current values of the kinematic variables, on the basis of respective preceding values of the kinematic variables and of a preceding uncertainty matrix representative of an uncertainty of the respective preceding values of the kinematic variables,
determining 203 a correction from:
respective current values of the kinematic variables and measurement of one of the kinematic variables and a gain matrix dependent on the measurement,
updating 204 the respective current values of the kinematic variables and the current uncertainty matrix on the basis of the correction.

The correction is calculated by a transformation matrix or gain matrix (denoted K in the following). This gain matrix K is calculated from an observation matrix (denoted H in the following). The observation matrix H in the prior art links, to first order, an error estimation of the state of the system to an error prediction of the GPS measurement. The gain matrix K will use the observation matrix H in order to carry out the reverse operation: determining a correction of the state based on a prediction error of the measurement observed.

In the invention, the observation matrix H and the innovation z (the difference between the current value of one of the kinematic variables and of the measurement of the kinematic variable) are no longer associated with the actual measurement of position provided by the GPS but to the virtual measurement of position of the point indicated by GPS in the reference frame of the bearer. As in the virtual observation techniques of velocity mentioned below, the value given to this virtual observation will be zero.

In a (linear, extended or invariant) Kalman filter, an observation is defined as a function of the state predicting the measurement of a sensor, for example a GPS receiver supplying an observation of position or an odometer supplying an observation of velocity in the reference frame of the bearer.

The Kalman filtering uses a matrix H linking, to first order, the state estimation error to a measurement prediction error.

A virtual observation is defined as a function of the state on which information is available which does not necessarily come from a sensor.

A detection of the stopping of a vehicle is modelled as a virtual observation of velocity in the geographic reference frame, the measurement of which would be zero.

A detection of the stopping of the vehicle can also be modelled as a virtual observation of velocity in the reference frame of the vehicle (comparable to that which would be given by an odometer), the measurement of which would be zero.

A piece of information modelled by a virtual observation can be assimilated using a Kalman filter, which uses a matrix H linking, to first order, the estimation error of the state to a prediction error of the virtual measurement. In particular, the fact of having or not having a sensor supplying this measurement does not make a difference. On the contrary, the same piece of information assimilated through different virtual observations leads to different Kalman filters (as is the case, for example, for the detecting of stopping above). The filters obtained will, in general, have a behaviour that is similar for small initial estimation errors, but different for larger initial estimation errors.

Figure 5:
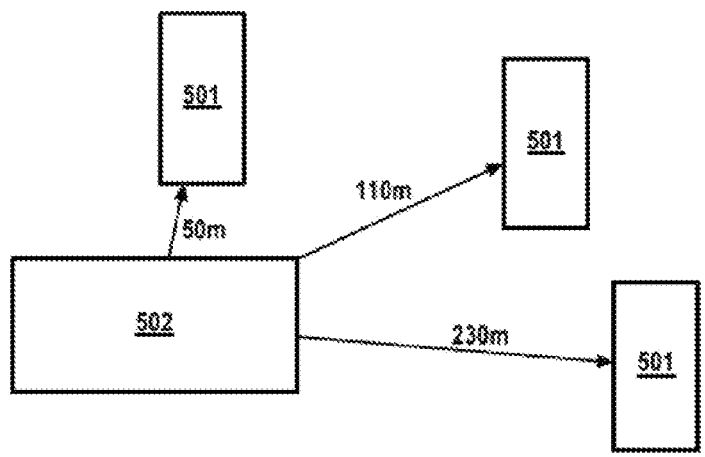
FIG. 5 illustrates the operation of the navigation method.

The invention is a method for combining inertial measurements with GPS measurements, but it relies on the notion of resetting on navigation marks, as shown in FIG. 5.

A series of reference frame points are known and mapped in advance (elements 501 in FIG. 5). The vehicle 502, bearing the navigation device DISP, has the capacity to measure their distance and their direction (only the distance is written on the arrows). This information, combined with the inertial measurements, makes it possible for the vehicle to know its trajectory (positions, velocities, orientations). The (many) algorithms enabling this type of resetting are different from algorithms making it possible to correct its position using the position measurement device 103, for example a GPS.

Figure 6:
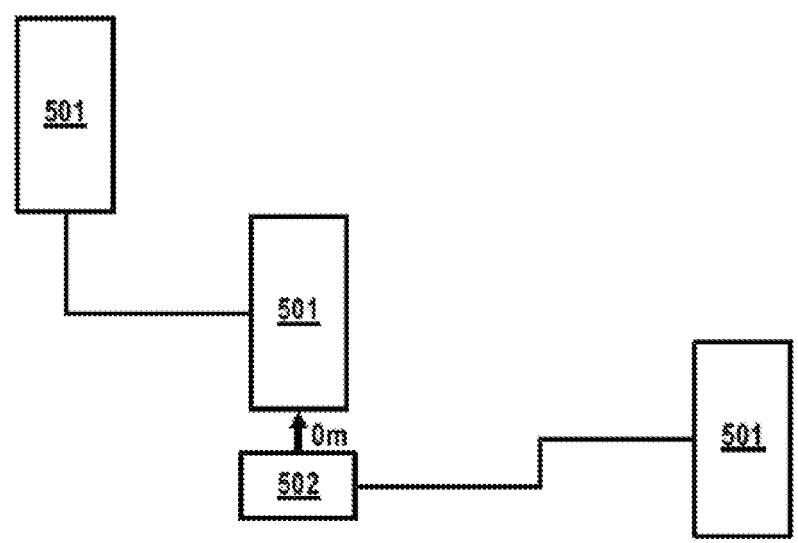
FIG. 6 illustrates the operation of the navigation method.

Moreover, as shown in FIG. 6, in the particular case where the vehicle passes over each navigation mark once, and only sees the navigation mark at the exact time of its passage, when the relative distance to the navigation mark is zero, the resetting algorithm chosen will search for a trajectory passing by all the navigation marks, and compatible with the inertia. It is seen that it then solves the same problem as an inertia-GPS combination algorithm which would have received GPS measurements located exactly on the positions of the navigation marks. Hence, in the invention, a module for resetting on navigation marks is provided with a series of virtual navigation marks located on the positions measured by the GPS, accompanied by a measurement (also virtual) of distance equal to zero. The module will therefore seek to reset the position of the vehicle on that of the GPS points. This makes it possible to obtain a navigation method which does not have the defects of the known methods.

The kinematic variables of the device comprise:
- an orientation of the device, the value of which is an actual or preceding orientation matrix T, of size 3 by 3, this orientation can also be represented by a quaternion,
- a velocity of the device, the value of which is an actual or preceding velocity vector V, of size 3, and
- a position of the device, the value of which is an actual or preceding position vector X, of size 3.

Moreover, an uncertainty matrix P representative of an uncertainty of the kinematic variables is used. This matrix is a covariance matrix.

In the rest of this document, the (matrix or vector) parameters bearing a circumflex accent represent estimated parameters, while the corresponding real parameters are denoted without circumflex accent.

The method comprises determining the value of these parameters which are respectively denoted $\hat{T}_{n|n}$, $\hat{V}_{n|n}$ and $\hat{X}_{n|n}$. The method also comprises determining the covariance matrix $P_{n|n}$ representative of the uncertainty of the current estimation. It is also assumed that a covariance matrix $P_{0|0}$, representing the initial uncertainty, is available at the start of the navigation.

Here, the index n represents the time step and, in conventional manner in Kalman filtering, the index n|n represents the estimation of the value at time n by taking account of the observation carried out at time n and the index n|n−1 represents the estimation of the value at time n without taking account of the observation carried out at time n.

The method of the invention uses a Kalman filter (more precisely an invariant Kalman filter), when the propagation phases (comprising the determination 202) using the inertial measurements succeed one another, and the updating phases (comprising the determination 203 of a correction and the updating 204) using the position data delivered by the position measurement device 103.

The determination 202 uses the following equations:

$$\hat{V}_{n|n-1} = \hat{V}_{n-1|n-1} + dt \cdot (\hat{T}_{n-1|n-1} f_n + g_n)$$

$$\hat{X}_{n|n-1} = \hat{X}_{n-1|n-1} + dt \cdot \hat{V}_{n-1|n-1}$$

$$\hat{T}_{n|n-1} = \hat{T}_{n-1|n-1} \Omega_n$$

$$P_{n|n-1} = F_n P_{n-1|n-1} F_n^T + Q_n$$

Where:
$\hat{V}_{n|n-1}$ is the current velocity vector,
$\hat{V}_{n-1|n-1}$ is the preceding velocity vector,
$\hat{X}_{n|n-1}$ is the current position vector,
$\hat{X}_{n-1|n-1}$ is the preceding position vector,
$\hat{T}_{n|n-1}$ is the current orientation matrix,
$\hat{T}_{n-1|n-1}$ is the preceding orientation matrix,
$g_n$ is a model of the gravity experienced by the navigation device DISP
$f_n$ is the specific force coming from the accelerometers
$\Omega_n$ is the rotation matrix coming from the gyroscopes $$-F_n = \begin{pmatrix} I_3 & 0_3 & 0_3 \\ dt(g_n)_x & I_3 & 0_3 \\ 0_3 & dt.I_3 & I_3 \end{pmatrix}$$

$Q_n$ is a covariance matrix representing the uncertainty added by each propagation step of the kinematic variables. The main source of this uncertainty is the imprecision of measurements from the accelerometers and gyroscopes. The exact value to be given to $Q_n$ is in general difficult to choose, but can be chosen using specifications provided by the manufacturer of the navigation device DISP.

$(l)_x$ corresponds to an asymmetric matrix produced with the components of the vector l, this matrix is such that for each vector $u(l)_x u = l \times u$ where x is a vector product.

P is a covariance matrix, the diagonal values of which represent the uncertainties of each parameter of the state, and the values of which that are not on the diagonal represent the crossed uncertainties between the parameters. $P_{n-1|n-1}$ is the preceding uncertainty matrix, $P_{n|n-1}$ is the current uncertainty matrix.

In an embodiment, step 203 of determining a correction ds uses a measurement of the position of the navigation device DISP, by means of the following equations:

$$z_n = \hat{X}_{n|n-1} - Y_n$$

$$K_n = P_{n|n-1} H_n^T (H_n P_{n|n-1} H_n^T + R_n)^{-1}$$

$$ds = K_n z_n$$

Where:
ds is the correction.
$Y_n$ the position provided by the position measurement device 103.
$R_n$ a covariance matrix used to represent measurement errors and the unmodelled quantities. It may or may not depend on the estimated kinematic variables.
$H_n = ((Y_n)_x \ 0_3 \ -I_3)$, this observation matrix makes it possible to link the virtual observation $\tilde{Y}_n = T_n^T(Y_n - X_n)$ with the kinematic variables of the navigation device DISP. It is defined by the expansion, to first order, $\hat{T}_{n|n-1}(\tilde{Y}_n - \hat{T}_{n|n-1}^T(Y_n - \hat{X}_{n|n-1})) \approx H_n \xi_{n|n-1}$ is a vector $\xi_{n|n-1}$ is a vector constructed conventionally from the last set of errors variables defined on page 3:

$$\xi_{n|n-1} = \begin{pmatrix} \log(e_T) \\ e_V \\ e_X \end{pmatrix} = \begin{pmatrix} \log(T_n \hat{T}_{n|n-1}^T) \\ V_n - T_n \hat{T}_{n|n-1}^T \hat{V}_{n|n-1} \\ X_n - T_n \hat{T}_{n|n-1}^T \hat{X}_{n|n-1} \end{pmatrix}$$

Where log( ) designates here a function which can obtain a rotational vector from a rotation matrix. This observation matrix differs from the matrix used in the prior art because it contains the value $Y_n$ of the measurement itself; hence $H_n$ represents an observation matrix or virtual observation matrix in the reference frame of the bearer of the navigation device DISP of the position of the point indicated by the GPS. The virtual observation being defined as a measurement of the position in the reference frame of the bearer of a beacon located at the coordinates measured by the position determining device. Then, a person skilled in the art knows to process this position by using a step of updating the extended or invariant Kalman filtering. In the case where the measurement is a velocity measurement in a fixed reference frame, coming from a GPS receiver for example, the virtual observation is defined as a measurement of the velocity in the reference frame of the bearer having, in a fixed reference frame, the velocity measured by the device for determining a velocity and having, in a fixed reference frame, the estimated position of the bearer. Then, a person skilled in the art knows to process this relative velocity measurement in the reference frame of the bearer by using a step of updating the extended or invariant Kalman filtering.

$K_n$ is a gain matrix transforming the error in the position vector into a correction to be applied on the other kinematic variables. This gain matrix K is determined on the basis of the observation matrix ds is a vector of size 9. The three first components $(ds_{1:3})$ correspond to the error in rotation. The following three components $(ds_{4:6})$ correspond to the error in velocity. The last three components $(ds_{7:9})$ correspond to the error in position.

The determination 203 of a correction makes it possible to determine the deviation of all the kinematic variables of the navigation device on the basis of the measurement of only one of the kinematic variables of the device.

This determining of the deviation is carried out by the gain matrix K, which takes into account the uncertainties in the kinematic variables of the navigation device DISP. If there is a low uncertainty, the position measurement $Y_n$ is weakly taken into account and, if there is a large uncertainty, the position measurement $Y_n$ is strongly taken into account.

The updating 204 uses the correction ds to produce the following equations:

$$\hat{T}_{n|n}=R(ds_{1:3})\hat{T}_{n|n-1}$$

$$\hat{V}_{n|n}=R(ds_{1:3})\hat{V}_{n|n-1}+ds_{4:6}$$

$$\hat{X}_{n|n}=R(ds_{1:3})\hat{X}_{n|n-1}+ds_{7:9}$$

$$P_{n|n}=(I-K_nH_n)P_{n|n-1}$$

R is a function which enables a rotation matrix of a vector to be obtained from the vector, $ds_{1:3}$ is the part of the correction vector relating to updating of the orientation, $ds_{4:6}$ is the part of the correction vector relating to updating of the velocity, $ds_{7:9}$ is the part of the correction vector relating to updating of the position $\hat{V}_{n|n}$ is the corrected velocity vector, $\hat{X}_{n|n}$ is the corrected position vector, $\hat{T}_{n|n}$ is the corrected orientation matrix, $P_{n|n}$ is the corrected uncertainty matrix.

In another embodiment, the updating 204 uses the correction ds in order to produce the following equations:

$$\hat{T}_{n|n}=R(ds_{1:3})\hat{T}_{n|n-1}$$

$$\hat{V}_{n|n}=R(ds_{1:3})\hat{V}_{n|n-1}+V(ds_{1:3})ds_{4:6}$$

$$\hat{X}_{n|n}=R(ds_{1:3})\hat{X}_{n|n-1}+V(ds_{1:3})ds_{7:9}$$

$$P_{n|n}=(I-K_nH_n)P_{n|n-1}$$

with $$V(u)-I_3+\frac{(1-\cos(\|u\|))}{\|u\|^2}(u)_\times+\frac{(\|u\|-\sin(\|u\|))}{\|u\|^3}(u)_\times^2,$$

in other words a matrix $V(ds_{1:3})$ is inserted.

Steps 202 to 204 of the method are repeated throughout the navigation.

In particular, the corrected vector velocity $\hat{V}_{n|n}$ becomes the next preceding velocity vector, the corrected vector position $\hat{X}_{n|n}$ becomes the next preceding velocity vector and the corrected orientation matrix $\hat{T}_{n|n}$ becomes the next preceding orientation matrix.

This method thus enables the location of the navigation device DISP and thus the navigation of the bearer of this device. The method offers a more precise navigation by combining all the available measurements in the same filter.

In the case of an autonomous vehicle subject to a possible loss of availability of the sensors, the subject matter also offers greater safety.

Figure 7:
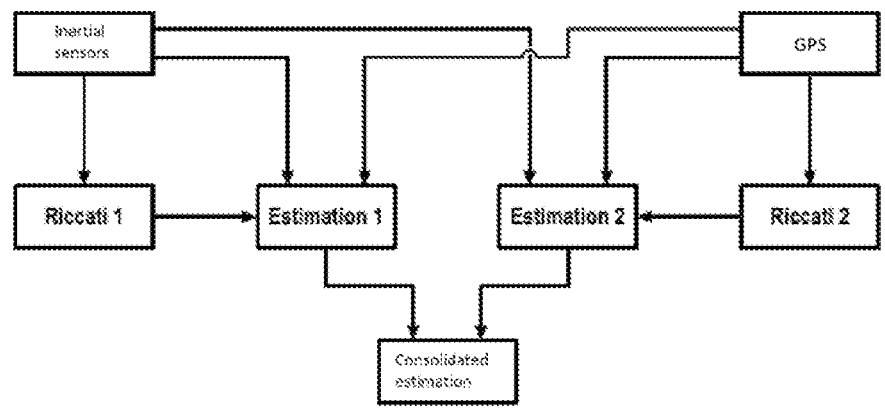
FIG. 7 shows a second embodiment of the navigation method of the invention.
Figure 8:
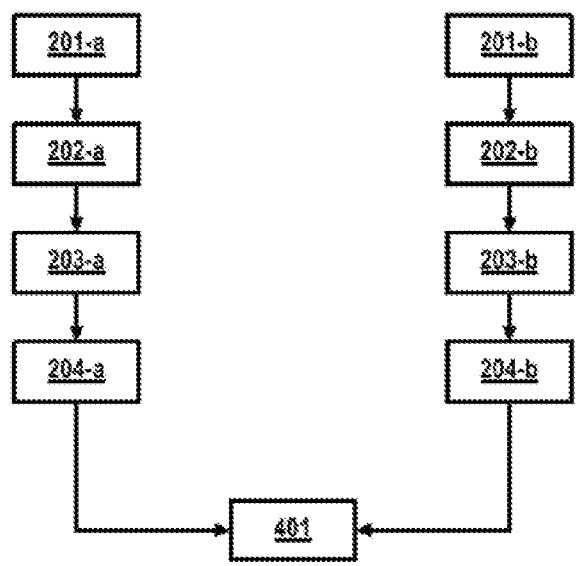
FIG. 8 shows, in another way, the second embodiment of the navigation method of the invention.

In other embodiments, other resetting methods can be used, for example conventional extended Kalman filter smoothing on sliding window constant gain filter particulate filter FIG. 7 shows another embodiment of the method for determining respective values of kinematic variables of the navigation device DISP. In this embodiment, steps 202, 203 and 204 are doubled in two branches and carried out in parallel. Then, at different times, the estimates from the two branches are combined. FIG. 8 shows this embodiment in a different way. Hence, the branches remain independent from the beginning to the end. At each time, the estimates of the two branches are extracted and are combined to provide a consolidated estimation, but this estimation will never return to the branches. It is only provided as output.

As shown in FIG. 8 the method comprises:

determining 202-*a* first respective current values of kinematic variables of a navigation device DISP on the basis of first respective preceding values of the kinematic variables, determining 203-*a* a first correction from:

first respective current values of the kinematic variables and a first measurement of one of the first kinematic variables and a gain matrix dependent on the first measurement, updating 204-*a* respective current values of the kinematic variables on the basis of the correction.

The first measurement is generally the position of the navigation device DISP.

The method of FIG. 8 also comprises:

determining 202-*b* second respective current values of kinematic variables of the navigation device DISP on the basis of first respective preceding values of kinematic variables of the navigation device DISP, determining 203-b a second correction from the second current values of the kinematic variables and from a second measurement of one of the kinematic variables, for example a position measurement of the navigation device DISP or a velocity measurement of the navigation device DISP and updating 204-b second current values of the kinematic variables on the basis of the second correction.

In an embodiment the first measurement and the second measurement are identical. In this case, the method makes it possible to have two different inertia-GPS combination methods in order to limit the risk of undetected failure.

In an embodiment the branches use different measurements. These measurements can come from the same sensor and be used alternately by one branch or by the other, or come from two different sensors.

Steps 202-a to 204-a are the steps of the first branch.

Steps 202-b to 204-b are the steps of the second branch.

Finally the method of FIG. 8 comprises a combining step 401. This combination starts with a plausibility test verifying the following relations $P(\hat{s}_2|\hat{s}_1, P_1) > \alpha$ and $p(\hat{s}_1|\hat{s}_2, P_2) > \alpha$ where $p(s|s_0, P_0)$ is the density of the multivariate normal distribution of mean $s_0$ and covariance matrix $P_0$ evaluated at the point s and $\alpha$ is a previously fixed threshold. In other words, this test verifies that each estimation agrees, to a high probability, with the other estimation. If the test is positive, the estimation of one of the two branches is repeated, for example that which does not use the invention.

Step 202-a uses the following equations:

$$\widehat{V'}_{n|n-n} = \widehat{V'}_{n-1|n-1} + dt \cdot (\widehat{T'}_{n-1|n-1} f_n + g_n)$$

$$\widehat{X'}_{n|n-1} = \hat{X}'_{n-1|n-1} + dt \cdot \widehat{V'}_{n-1|n-1}$$

$$\widehat{T'}_{n|n-1} = \widehat{T'}_{n-1|n-1} \Omega_n$$

$$P'_{n|n-1} = F'_n P'_{n-1|n-1} F'^T_n + Q'_n$$

Where:

$\hat{V}_{n|n-1}$ is the first current velocity vector, $\widehat{V'}_{n-1|n-1}$ is the first preceding velocity vector, $\widehat{X'}_{n|n-1}$ is the first current position vector, $\widehat{X'}_{n-1|n-1}$ is the first preceding position vector, $\widehat{T'}_{n|n-1}$ is the first current orientation matrix, $\widehat{T'}_{n-1|n-1}$ is the first preceding orientation matrix, $g_n$ is the model of the gravity experienced by the navigation device DISP $$-F'_n = \begin{pmatrix} I_3 & 0_3 & 0_3 \\ dt(g_n)_\times & I_3 & 0_3 \\ 0_3 & dt.I_3 & I_3 \end{pmatrix}$$

$\Omega_n$ is the rotation matrix $Q_n$ is a covariance matrix representing the uncertainty added by each propagation step of the kinematic variables. The main source of this uncertainty is the imprecision of measurements from the accelerometers and gyroscopes. The exact values to be given to $Q_n$ are in general difficult to choose, but can be chosen using specifications provided by the manufacturer of the central control unit.

$(l)_x$ corresponds to an asymmetric matrix produced with the components of the vector l, this matrix is such that for any vector $u(l)_x u = l \times u$ where x is a vector product, P' is a first covariance matrix, the diagonal values of which represent the uncertainties of each state parameter and therefore the values which are not on the diagonal represent the crossed uncertainties between the parameters. $P'_{n-1|n-1}$ is the first preceding uncertainty matrix, $P'_{n|n-1}$ is the first current uncertainty matrix.

Step 202-b uses the following equations:

$$\widehat{V''}_{n|n-1} = \widehat{V''}_{n-1|n-1} + dt \cdot (\widehat{T''}_{n-1|n-1} f_n + g_n)$$

$$\widehat{X''}_{n|n-1} = \hat{X}''_{n-1|n-1} + dt \cdot \widehat{V''}_{n-1|n-1}$$

$$\widehat{T''}_{n|n-1} = \widehat{T''}_{n-1|n-1} \Omega_n$$

$$P''_{n|n-1} = F''_n P''_{n-1|n-1} F''^T_n + Q''_n$$

Where:

$\hat{V}''_{n|n-1}$ is the second current velocity vector, $\widehat{V''}_{n-1|n-1}$ is the second preceding velocity vector, $\widehat{X''}_{n|n-1}$ is the second current position vector, $\widehat{X''}_{n-1|n-1}$ is the second preceding position vector, $\widehat{T''}_{n|n-1}$ is the second current orientation matrix, $\widehat{T''}_{n-1|n-1}$ is the second preceding orientation matrix, $g_n$ is a model of the gravity experienced by the navigation device DISP $$-F''_n = \begin{pmatrix} \Omega^T_n & 0_3 & 0_3 \\ -dt.\Omega^T_n(f)_\times & \Omega^T_n & 0_3 \\ 0_3 & dt.\Omega^T_n & \Omega^T_n \end{pmatrix}$$

$\Omega_n$ is the rotation matrix $Q_n$ is a covariance matrix representing the uncertainty added by each propagation step of the kinematic variables. The main source of this uncertainty is the imprecision of measurements from the accelerometers and gyroscopes. The exact values to be given to $Q_n$ are in general difficult to choose, but can be chosen using specifications provided by the manufacturer of the central control unit.

$(l)_x$ corresponds to an asymmetric matrix produced with the components of the vector l, this matrix is such that for each vector $u(l)_x u = l \times u$ where x is a vector product.

P" is a second covariance matrix, the diagonal values of which represent the uncertainties of each state parameter and therefore the values which are not on the diagonal represent the crossed uncertainties between the parameters. $P''_{n-1|n-1}$ is the second preceding uncertainty matrix, $P''_{n|n-1}$ is the second current uncertainty matrix.

Step 203-a of determining the first correction ds' uses a measurement of the position of the navigation device DISP, via the following equations:

$$z_n = \hat{X}_{n|n-1}' - Y_n'$$

$$K'_n = P'_{n|n-1} H'^T_n (H'_n P'_{n|n-1} H'^T_n + R_n')^{-1}$$

$$ds' = K'_n z_n$$

$$H'_n = ((Y_n)_x \; 0_3 \; -I_3)$$

Where:

ds' is the first correction.

$Y_n'$ the position provided by the measurement device of a position 103-a.

$R_n'$
a covariance matrix used to represent the measurement errors and the unmodelled quantities. It may or may not depend on the estimated kinematic variables.

$H_n=((Y_n)_x \ 0_3 -1_3)$, this observation matrix makes it possible to link the virtual observation $\tilde{Y}_n = T_n^T(Y_n - X_n)$ with the kinematic variables of the navigation device DISP. It is defined by the expansion, to first order, $\hat{T}_{n|n-1}(\tilde{Y}_n - \hat{T}_{n|n-1}^T(Y_n - \hat{X}_{n|n-1})) \approx H_n \xi_{n|n-1}$ where $\xi_{n|n-1}$ is a vector that is conventionally constructed from the last set of error variables defined on page 3:

$$\xi_{n|n-1} = \begin{pmatrix} \log(e_T) \\ e_V \\ e_X \end{pmatrix} = \begin{pmatrix} \log\left(T_n \hat{T}_{n|n-1}^T\right) \\ V_n - T_n \hat{T}_{n|n-1}^T \hat{V}_{n|n-1} \\ X_n - T_n \hat{T}_{n|n-1}^T \hat{X}_{n|n-1} \end{pmatrix}$$

Where log( ) designates here a function which can obtain a rotational vector from a rotation matrix. This observation matrix differs from the matrix used in the prior art because it contains the value $Y_n$ of the measurement itself; hence $H_n$ represents an observation matrix or virtual observation matrix in the reference frame of the bearer of the navigation device DISP of the position of the point indicated by the GPS. The virtual observation being defined as a measurement of the position in the reference frame of the bearer of a beacon located at the coordinates measured by the position determining device. Then, a person skilled in the art knows to process this position by using a step of updating the extended or invariant Kalman filtering. In the case where the measurement is a velocity measurement in a fixed reference frame, coming from a GPS receiver for example, the virtual observation is defined as a measurement of the velocity in the reference frame of the bearer having, in a fixed reference frame, the velocity measured by the device for determining a velocity and having, in a fixed reference frame, the estimated position of the bearer. Then, a person skilled in the art knows to process this relative velocity measurement in the reference frame of the bearer by using a step of updating the extended or invariant Kalman filtering.

$K'_n$ is a first gain matrix transforming the error in the vector position into a correction to be applied to the other kinematic variables.

Step 203-b of determining the second correction ds" uses a measurement of the position of the navigation device DISP, via the following equations:

$$z_n = \hat{T}_{n|n-1}^{T"}(Y_n" - \hat{X}"_{n|n-1})$$

$$K"_n = P"_{n|n-1} H"_n^T (H"_n P"_{n|n-1} H"_n^Y + R_n")^{-1}$$

$$ds" = K"_n z_n$$

Where:
ds" is the second correction.
$Y_n"$ is the position provided by the measurement device of a position 103-b.
$R_n"$ a covariance matrix used to represent measurement errors and the unmodelled quantities. It may or may not depend on the estimated kinematic variables.
$H"_n = (0_3 \ 0_3 \ I_3)$ observation matrix which can link the measured position variations $Y_n$
to the kinematic error variables of the navigation device DISP. The measurement $Y_n$ will not appear in $H_n'$
$K"_n$ is a gain matrix transforming the error in the position vector into a correction to be applied on the other kinematic variables.

ds' and ds" are vectors of size 9. The three first components ($ds'_{1:3}$ and $ds"_{1:3}$) correspond to the error in rotation. The following three components ($ds'_{4:6}$ and $ds"_{4:6}$) correspond to the error in velocity. The last three components ($ds'_{7:9}$ and $ds"_{7:9}$) correspond to the error in position.

The matrices $K'_n$ and $K"_n$ are known under the name of gain matrices.

Step 204-a uses the following equations:

$$\hat{T}'_{n|n} = R(ds'_{1:3}) \hat{T}'_{n|n-1}$$

$$\hat{V}'_{n|n} = R(ds'_{1:3}) \hat{V}'_{n|n-1} + ds'_{4:6}$$

$$\hat{X}'_{n|n} = R(ds"_{1:3}) \hat{X}'_{n|n-1} + ds'_{7:9}$$

$$P'_{n|n} = (-K'_n H'_n) P'_{n|n-1}$$

R is a function which enables a rotation matrix of a vector to be obtained from the vector,
$ds'_{1:3}$ is the part of the first correction vector relating to the updating of the orientation,
$ds'_{4:6}$ is the part of the first correction vector relating to the updating of the velocity,
$ds'_{7:9}$ is the part of the first correction vector relating to the updating of the position
$\hat{V}'_{n|n}$ is the corrected first vector velocity,
$\hat{X}'_{n|n}$ is the corrected first vector position,
$\hat{T}'_{n|n}$ is the corrected first orientation matrix,
$P'_{n|n}$ is the corrected first uncertainty matrix.

Step 204-b uses the following equations:

$$\hat{T}_{n|n}' = \hat{T}_{n|n-1}' R(ds_{1:3}')$$

$$\hat{V}_{n|n}' = \hat{V}_{n|n-1}' + \hat{T}_{n|n-1}' ds_{4:6}'$$

$$\hat{X}_{n|n}' = \hat{X}_{n|n-1}' + \hat{T}_{n|n-1}' ds_{7:9}'$$

$$P_{n|n}' = (I - K_n' H_n') P_{n|n-1}'$$

R is a function which enables a rotation matrix of a vector to be obtained from the vector,
$ds"_{1:3}$ is the part of the second correction vector relating to the updating of the orientation,
$ds"_{4:6}$ is the part of the second correction vector relating to the updating of the velocity,
$ds"_{7:9}$ is the part of the second correction vector relating to the updating of the position
$\hat{V}"_{n|n}$ is the corrected second vector velocity,
$\hat{X}"_{n|n}$ is the corrected second vector position,
$\hat{T}"_{n|n}$ is the corrected second orientation matrix,
$P"_{n|n}$ is the corrected second uncertainty matrix.

The combination 401 enables the determining of respective consolidated values of the kinematic variables. This determination can, for example, be carried out by a weighted average of the corrected first vector position with the corrected second vector position, of the corrected first vector velocity with the corrected second vector velocity and of the corrected first orientation matrix with the second corrected orientation matrix.

This step 401 can also implement a statistical test checking the similarity or consistency of two estimators in order to obtain an estimator with better integrity than a conventional Kalman filter. The plausibility test would check the following relations $p(\Delta s"|0, P_{n|n}") > \alpha$ and $p(\Delta s'|0, P_{n|n}') > \alpha$ where $\Delta s'$ (resp. $\Delta s"$) is a vector representing the deviation between the two navigation states, coming from branches a and b expressed in the same coordinate system as P'(resp. P"), p(s|0, P) is the density of the centred multivariate normal distribution of covariance matrix P, evaluated at point s, and α is a threshold fixed beforehand. The deviation Δs can be, for example, the characteristic logarithmic error of the invariant filtering. This test can be summarised by saying that it checks that each estimation agrees, to a high probability, with the other estimation.

Another possible test consists in calculating a deviation between the two normal distributions returned by the two filters, this deviation being, for example, the Kullback-Leibler divergences defined by the formula:

$$\frac{1}{2}\left(tr(P'^{-1}\tilde{P}'') + \Delta s'^T P'^{-1} \Delta s' - k - \ln\left(\frac{det(P')}{det(\tilde{P}'')}\right)\right)$$

Where tr( ) is the trace function, k is the dimension of the state of the system (k=9 if only the orientations, velocities and positions are estimated) ln( ) designates the logarithmic function, and det( ) the determinant function, $\tilde{P}''$
is the matrix P''
written in the same coordinate system as P' (the two Kalman filters of the branches a and b are different and can therefore represent their errors in different coordinate systems). Alternatively, it is possible to swap the rules of P'
and P'':

$$\frac{1}{2}\left(tr(P''^{-1}\tilde{P}') + \Delta s''^T P''^{-1} \Delta s'' - k - \ln\left(\frac{det(P'')}{det(\tilde{P}')}\right)\right)$$

The test will be positive if the deviation thus defined remains less than a threshold fixed beforehand.

If the test is positive, the estimation of one of the two branches is repeated, for example that which does not use the invention. It can also return the mean of the kinematic variables estimated by the two branches. Another possibility is to leave the state s' and to define a correction δs'=P'[P'+$\tilde{P}''$]$^{-1}$Δs' which will be applied to s' by the same formulas as the correction ds' of the updating step.

Symmetrically, it is possible to leave the state ds'' and to define a correction δs''=P''[P''+$\tilde{P}'$]$^{-1}$Δs'' which will be applied to s'' by the same formulas as the correction ds'' of the updating step.

If the first values and the second values are coherent and can return, for example:
- an average of the first values and second values,
- an average of the first values and the second weighted values
- simply, the first values or the second values.

By comparing the Riccati equation of the first branch (steps 202-*a* to 204-*a*) and of the second branch (steps 202-*b* to 204-*b*) it is observed that:
- that of the first branch makes the GPS measurements appear, but not the inertial increments,
- that of the second branch makes the inertial increments appear, but not the GPS measurements.

The first branch will therefore be especially robust to inertial errors and the second to GPS errors. This makes the use of a statistical test checking the similarity or consistency particularly advantageous.

The invention claimed is:

1. A method of assisting navigation of a vehicle equipped with a navigation device comprising a measurement device of a position of the navigation device and an inertial measurement unit configured to measure an angular velocity of the navigation device, a rotation matrix $\Omega_n$ of the navigation device being derived from the angular velocity, the method comprising:
acquiring a priori values of kinematic variables of the navigation device, the kinematic variables comprising
a position of the navigation device, a current value of which being a current position vector $X_n$, and
an orientation of the navigation device, a current value of which being a current orientation matrix $T_n$ function of the rotation matrix $\Omega_n$;
determining, using a Kalman filter, respective current values of kinematic variables of the navigation device and a current uncertainty matrix representative of an uncertainty of the respective current values of the kinematic variables, from respective preceding values of the kinematic variables,
determining a virtual observation function from a measurement of the position of the navigation device Yn in a reference frame, as $$\tilde{Y}_n = T_n^T(Y_n - X_n),$$

obtaining an observation matrix by applying a limited first-order expansion to the virtual observation function,
obtaining a gain matrix dependent on the measurement from the observation matrix,
determining a correction from:
the respective current values of the kinematic variables,
the current uncertainty matrix,
the measurement of one of the kinematic variables,
the gain matrix dependent on the measurement,
updating, using the Kalman filter, the respective current values of the kinematic variables from the correction and the current uncertainty matrix.

2. The method according to claim 1, wherein the measurement of one of the kinematic variables is a measurement of position of the vehicle.

3. The method according to claim 1, wherein the observation matrix has the following form $$H_n = ((Y_n) \times 0_3 - I_3)$$

where Yn is the measurement $(Y_n)_\times$ corresponds to an asymmetric matrix produced with the components of the measurement Yn, such that for any vector u $(Y_n)_\times u = Y_n \times u$ where × is a vector product, $0_3$ is a zero matrix of dimension 3×3, and $I_2$ is an identity matrix of dimension 3×3.

4. The method according to claim 1, the kinematic variables further comprising:
a velocity of the navigation device, a current value of which is a current velocity vector and a preceding value of which is a preceding velocity vector and
wherein
a preceding value of the orientation of the navigation device is a preceding orientation matrix; and
a preceding value of the position of the navigation device is a preceding position vector, the current uncertainty matrix being representative of an uncertainty of the current orientation matrix, the current velocity vector and the current position vector, and
a preceding uncertainty matrix being representative of an uncertainty of the preceding orientation matrix, the preceding velocity vector and the preceding position vector.

5. The method according to claim 4, wherein the current values are associated with a current time, the preceding values are associated with a preceding time, and determining the respective current values of the kinematic variables comprises:

determining the current velocity vector by addition, to the preceding velocity vector, of an integration over a time interval between the preceding time and the current time, of a sum of a force specific to the navigation device and a model of Earth gravity experienced by the navigation device, determining the current position vector by addition, to the preceding position vector, of an integration over the time interval, of the preceding velocity vector, determining the current orientation matrix by multiplication of the preceding orientation matrix with a matrix representative of a rotation of the navigation device, and/or determining the current uncertainty matrix on the basis of the preceding uncertainty matrix.

6. The method according to claim 4, the measurement being a measurement of a position of the navigation device, and wherein determining the correction comprises:

subtracting the current position vector and the measurement of the position, and multiplying the subtraction by the gain matrix.

7. The method according to claim 4, wherein the correction is a correction vector, and wherein updating the respective current values comprises:

updating the current orientation matrix by multiplication of a rotation matrix of a first part of the correction vector and the current orientation matrix, updating of the current velocity vector by adding, to a second part of the correction vector, a multiplication of the rotation matrix of the first part of the correction vector and the current velocity vector, and/or updating the current position vector by addition, to a third part of the correction vector, of a multiplication of the rotation matrix of the first part of the correction vector and the current position vector.

8. The method according to claim 4, wherein the respective current values of the kinematic variables are first respective current values of the kinematic variables, the respective preceding values of the kinematic variables are first respective preceding values of the kinematic variables, the correction is a first correction, the first measurement of one of the kinematic variables is a first measurement of one of the kinematic variables, the gain matrix is a first gain matrix, the method further comprising:

determining second respective current values of the kinematic variables of the navigation device, from second respective preceding values of the kinematic variables, determining a second correction from:

second respective current values of the kinematic variables, a second measurement of one of the kinematic variables and a second gain matrix, updating the second respective current values of the kinematic variables from the second correction.

9. The method according to claim 8, further comprising determining respective consolidated values of the kinematic variables from the first respective current values of the kinematic variables and the second respective current values of the kinematic variables.

10. The method according to claim 9, wherein determining respective consolidated values of the kinematic variables comprises determining a similarity between the first corrected values and the second corrected values and, when the similarity exceeds a threshold, averaging the first corrected values and the second corrected values or weighted averaging of the first corrected values and the second corrected values or selecting the first corrected values or the second corrected values.

11. A navigation device comprising:

a processing unit, three accelerometers, three gyroscopes, and a measurement device of a position of the navigation device, the processing unit being configured to implement the method of claim 1.

12. A computer program stored in a computer readable medium comprising program code instructions for executing the method of claim 1.

* * * * *